United States Patent [19]
Hsieh

[11] Patent Number: 5,223,129
[45] Date of Patent: Jun. 29, 1993

[54] MULTI-LAYER AERATING FILTER

[76] Inventor: Chin-Hui Hsieh, 2F., No. 7, Lane 4, Ching-Nien Road I, Kaohsiung, Taiwan

[21] Appl. No.: 993,359

[22] Filed: Dec. 18, 1992

[51] Int. Cl.$^5$ .............................. C02F 3/02; C02F 3/10
[52] U.S. Cl. ..................................... 210/150; 210/169; 210/221.2
[58] Field of Search ..................... 210/169, 170, 221.2, 210/150, 151, 747

[56] References Cited

U.S. PATENT DOCUMENTS

| | | | |
|---|---|---|---|
| 308,575 | 11/1884 | Puffer | 210/151 |
| 4,333,893 | 6/1982 | Clyde | 210/150 |
| 4,613,433 | 9/1986 | McKeown | 210/150 |
| 4,931,401 | 6/1990 | Safi | 210/150 |
| 5,160,607 | 11/1992 | Thiemer et al. | 210/169 |

*Primary Examiner*—Stanley S. Silverman
*Assistant Examiner*—Cynthia L. Nessler
*Attorney, Agent, or Firm*—Ladas & Parry

[57] ABSTRACT

A multi-layer aerating filter comprises a plurality of pan-like containers being sealed and arranged in a stack and disposed within a casing. Each container has at least a water level pipe and a plurality of apertures on the bottom thereof. A plurality of infiltration spheres are disposed on the inner surface of the bottom of each container. A water inlet pipe and a blow-off pipe pass through the top of the casing and penetrate into the uppermost container. An air supply pipe passes through the casing and penetrates into the lowest container. A water discharge pipe is installed at the side of the casing near the bottom thereof. Aquarium water flowed into the containers via the water inlet pipe is aerated by the air charged into the containers via the air supply pipe to increase dissolved oxygen content and to facilitate the attachment of nitrifying bacteria on the infiltration spheres and cultivation of active sludge.

7 Claims, 4 Drawing Sheets

MULTI-LAYER AERATING FILTER

BACKGROUND OF THE INVENTION

The present invention relates to a multi-layer aerating filter, in particular, to an apparatus for aquaculture and providing a better filtering function.

The most important task in aquaculture is to maintain proper quality of the water in aquaria for the need of water plants and animals for human use or consumption. The economical and effective method is to circulate aquarium water through a filtering apparatus to eliminate the detrimental materials and to ensure the purity of the water when reusing it.

Conventionally, the filtering apparatus employ filter materials contained therein to hold back contaminants. Nevertheless, the filtering functions of the known apparatus are unsatisfactory because they have many drawbacks. For example, the effective infiltration area of the filter material used in the conventional filtering apparatus is restricted by its exterior surfaces, and this area is usually small. It is easy to accumulate a large amount of contaminants on the surfaces of the filter material and to clog the infiltration passage in a short period, and, therefore, the flow rate of circulating water decreases. As a result, the oxygen provision for the nitrifying bacteria in the filter material becomes insufficient. It is difficult to culture nitrifying bacteria and the organisms can not be adequately digested by enough nitrifying bacteria.

Furthermore, in the case of aeration operation, a great amount of oxygen is dissolved into water, and the harmful impurities is strained out such that the filtering function is more effective. However, there is no such design utilizing aeration process in the conventional filtering apparatus.

SUMMARY OF THE INVENTION

It is therefore an object of this invention to provide a multi-layer aerating filter comprising a plurality of pan-like containers being sealed and arranged in a stack and disposed within a casing. Each container has at least a water level pipe and a plurality of apertures on the bottom thereof. A plurality of infiltration spheres are disposed on the inner surface of the bottom of each container. A water inlet pipe and a blow-off pipe pass through the top of the casing and penetrate into the uppermost container. An air supply pipe passes through the casing and penetrates into the lowest container. A water discharge pipe is installed at the side of the casing near the bottom thereof. Aquarium water flowed into the containers via the water inlet pipe is aerated by the air charged into the containers via the air supply pipe to increase dissolved oxygen content and to facilitate the attachment of nitrifying bacteria on the infiltration spheres and cultivation of active sludge.

It is another object of this invention to provide a multi-layer aerating filter which utilizes filamentary water streams generated by the aquarium water passing through the apertures to aerate with the forced air for oxygen exchange. In this manner, each infiltration sphere will have high dissolved oxygen content therein to provide the efficacy of digesting organisms by the sufficient amount of nitrifying bacteria and active sludge.

It is a further object of this invention to provide a multi-layer aerating filter adaptable to the processes associated with aeration, nitrification and activated sludge to effectively solve the problem of toxic gases in the aquarium water such as $NH_3$ and $NO_2$.

It is yet a further object of this invention to provide a multi-layer aerating filter, wherein impurities in the aquarium water can be discharged by the forced air generating numerous intermolecular impacts on the infiltration spheres.

It is still a further object of this invention to provide a multi-layer aerating filter without excessive deposits and thick bacteria film occurring on the infiltration spheres.

These and other objects, advantages and features of the present invention will be more fully understood and appreciated by reference to the written specification and appended drawings.

DETAILED DESCRIPTION OF THE INVENTION

Figure 1:
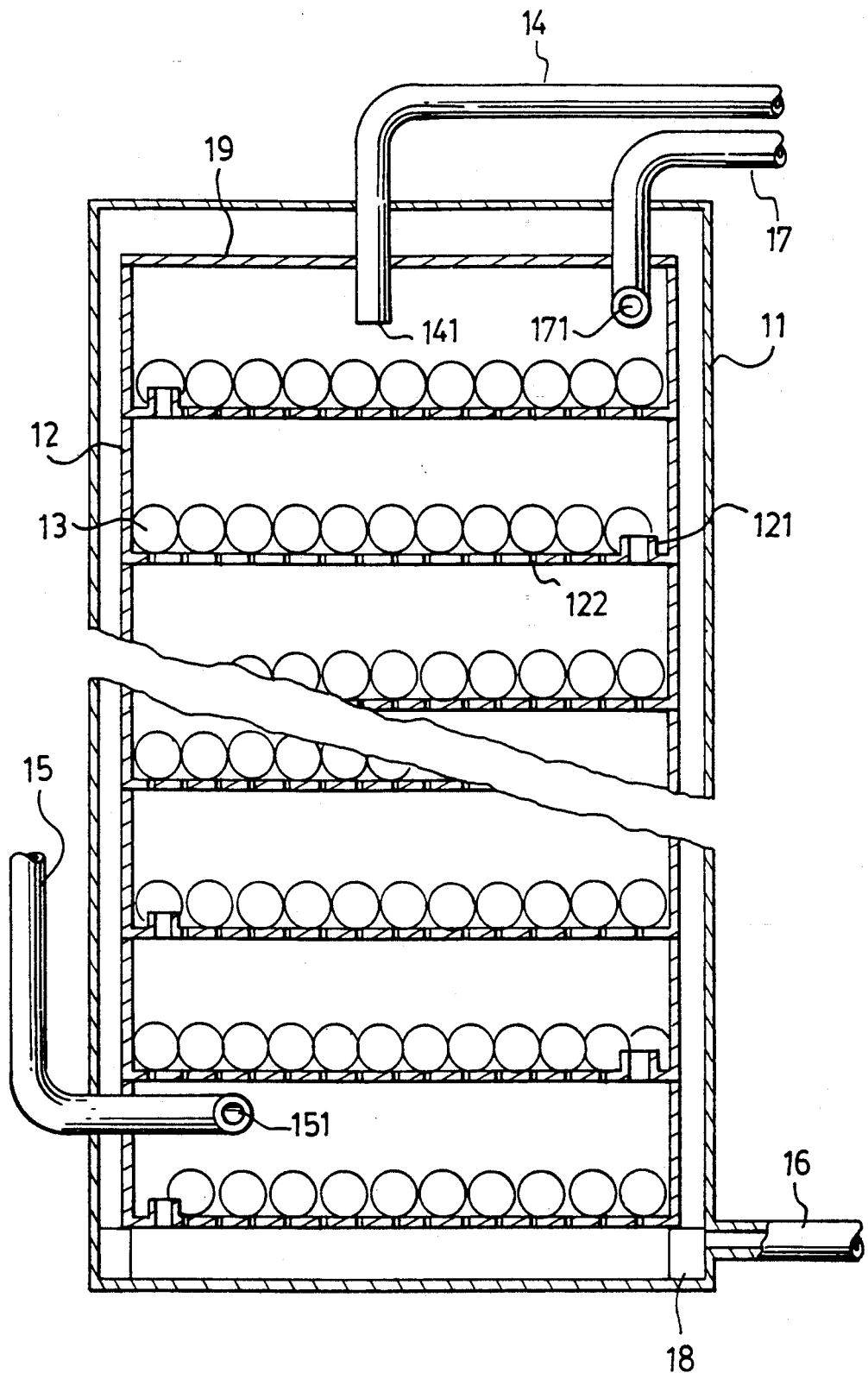
FIG. 1 is a cross-sectional view of a multi-layer aerating filter in accordance with the present invention.
Figure 2:
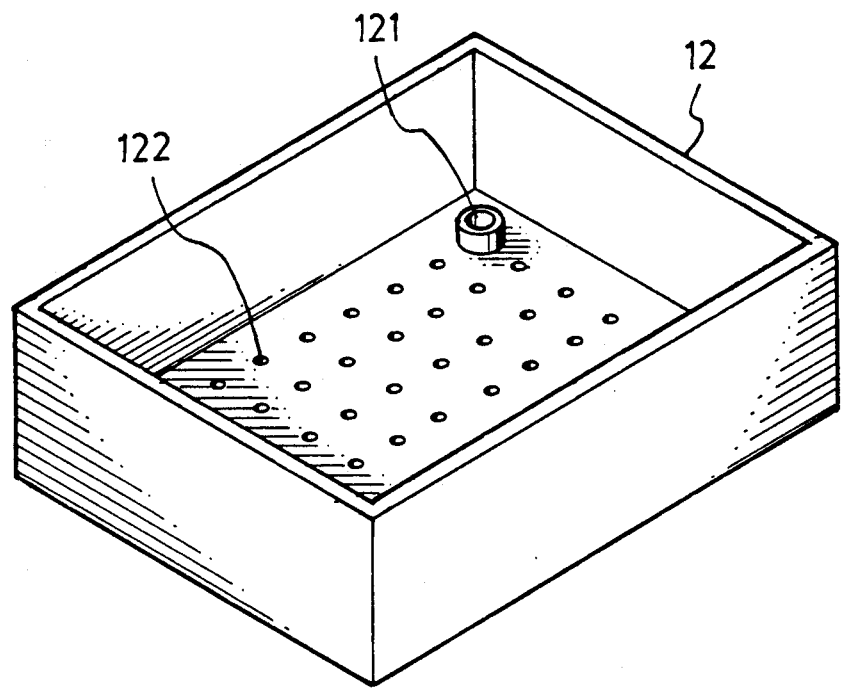
FIG. 2 is a perspective view illustrating one layer of a container.
Figure 3:
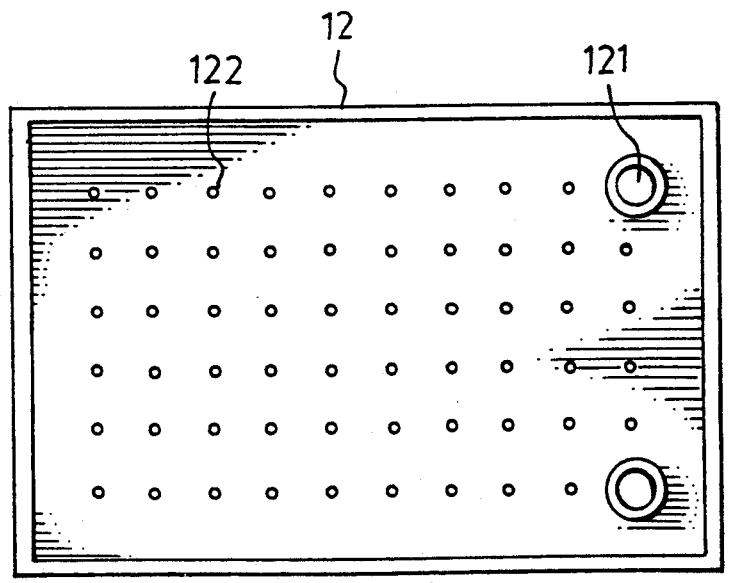
FIG. 3 is a top view of one layer of a container.

Referring now to FIGS. 1 through 3, a multi-layer aerating filter according to the present invention comprises a plurality of pan-like containers 12 being sealed and arranged in a stack and disposed within a casing 11 by any known means connected therebetween, wherein the top edge of the uppermost container is sealed by a cover plate 19. There is a space between the lowest container 12 and the bottom of the casing 11 which is formed by supports 18 located therebetween for containing certain filtered aquarium water. Each container 12 has at least a water level pipe 121 with one end above the bottom of the container 12. The water level pipe 121 is located near the corner of the container 12 and in a different position (preferably opposite to each other) with the water level pipe in the other container. A plurality of apertures 122 are provided on the bottom of each container 12. A plurality of infiltration spheres 13 are disposed on the inner surface of the bottom of each container 12, as will be further described below.

At the top of the casing 11, a water inlet pipe 14 is connected thereto with one end 141 penetrating into the uppermost container 12 for conveying the aquarium water from the aquarium (not shown) to the container 12. A water discharge pipe 16 is installed at the side of the casing near the bottom thereof to convey the filtered water back into the original aquarium.

An air supply pipe 15 is installed to pass through the casing 11 near the bottom with one end 151 penetrating into the lowest container 12. A blow-off pipe 17 is installed to pass through the casing 11 at the top with one end 171 penetrating into the uppermost container 12.

Figure 4:
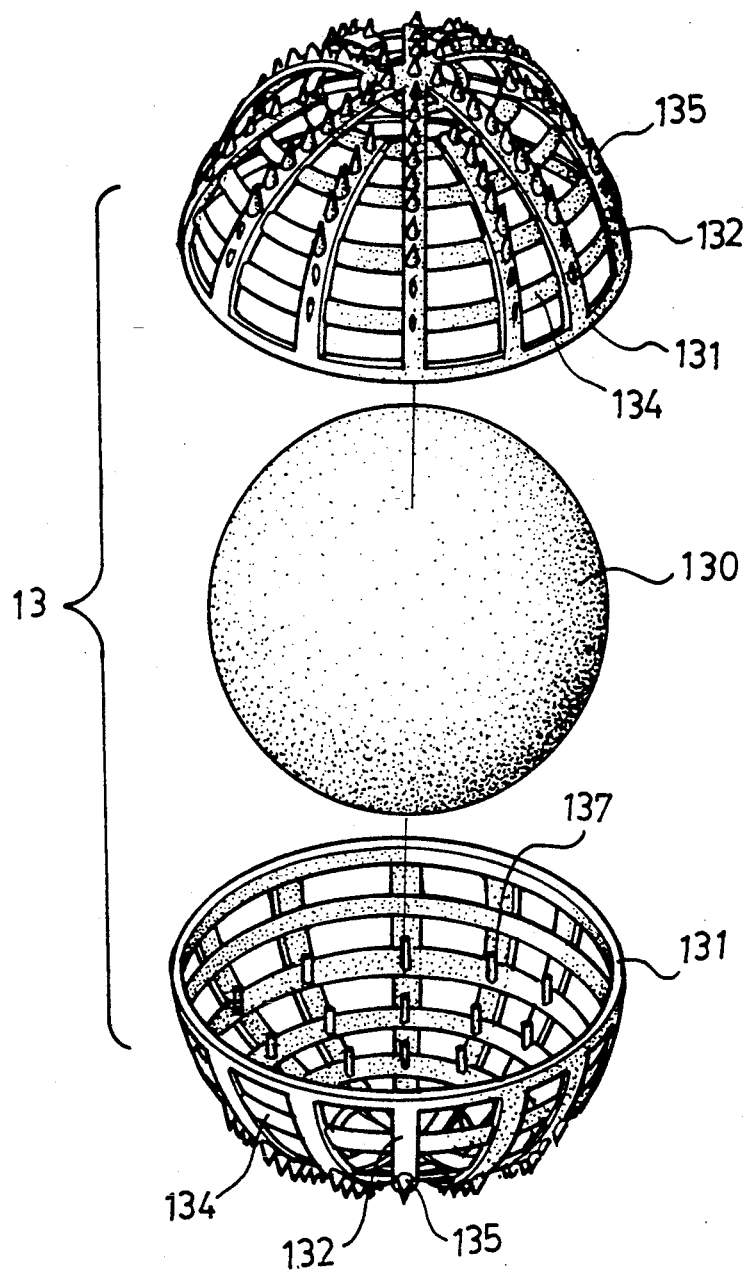
FIG. 4 is an exploded view of an infiltration sphere.

As shown in FIG. 4, each infiltration sphere 13 comprises a spherical frame consisting of two semi-spherical halves 131 and a sponge-like spherical core 130 contained in the spherical frame. The spherical frame includes a plurality of longitudinal strips 132 and latitudinal strips 134. The outside and inside of each longitudinal strip 132 and latitudinal strip 134 are provided with a plurality of projections 135 and 137, wherein the outer projections 135 are in the cone-like shape.

The diameter of the spherical core 130 is smaller than the inside diameter of the frame. The spherical core 130 is supported by the inner projections 137 without directly contacting with the inside of the frame such that the infiltration area of the spherical core 130 can be maximized.

Figure 5:
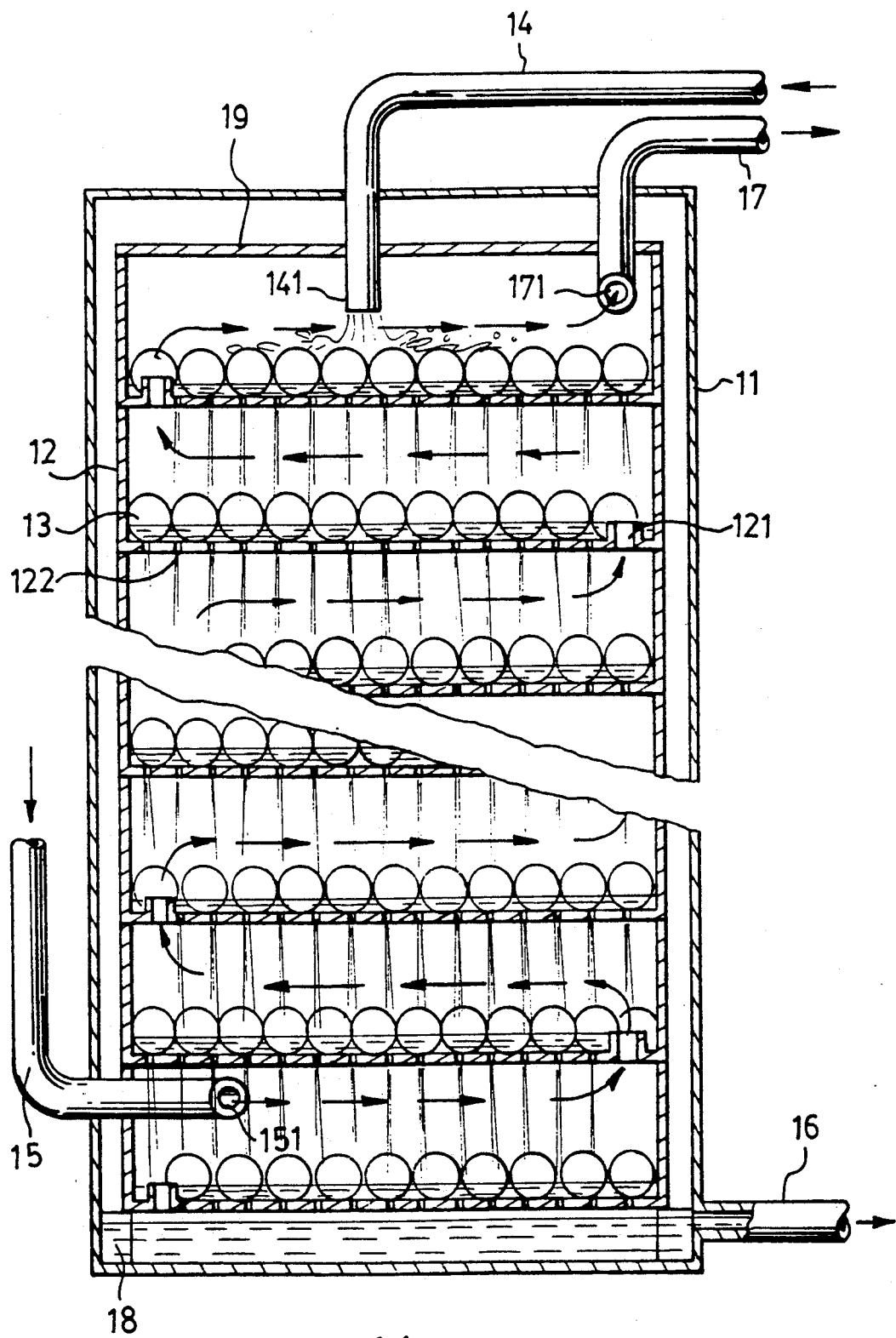
FIG. 5 is a schematic view illustrating the flow of aquarium water and air in a multi-layer aerating filter in accordance with the present invention.

The operation of the present invention is illustrated by FIG. 5, when the aquarium water is pumped to the uppermost container 12, it will form filamentary water streams to spray downward uniformly through the apertures 122 to the next container 12. Successively, the aquarium water will pass through all containers 12 in the same way. When the water level in one of the container 12 is excessively high, the surplus water will overflow to the lower container 12 through the water level pipe 121. The forced air conveyed by the air supply pipe 15 into the casing 11 flows upward from the lowest container 12 to the uppermost container 12 to exchange with the downward aquarium water from the uppermost container 12 to the lowest container 12 to form a perfect aeration process for the aquarium water. In this way, a great amount of oxygen is dissolved into the water and the harmful impurities in the water are strained out by the air flow through the blow-off pipe 17.

Because infiltration spheres 13 are orderly laid on each container 12 in a layer and each infiltration sphere 13 has a maximum contacting surface with the aquarium water, the total filtering extent is maximized. Moreover, each infiltration sphere 13 laid on the container 12 is above the water level pipe 121, preferably, the diameter of the infiltration sphere 12 is substantially double the height of the water level pipe 121. In this manner, the lower halves 131 of the infiltration spheres 13 are entirely submerged in the aquarium water flowed into the containers 12. As for the upper halves 131 of the infiltration spheres 13, they are exposed to the spraying water from the apertures 122 of the above container 12. When the filamentary water streams generated by the aquarium water passing through the apertures 122 spray the outer projections 135 on the spherical frame, more filamentary water streams are achieved. Hence, the infiltration spheres 13 receive the largest amount of oxygen and the probability of clogging the filter material due to the uniform distribution of spraying water. Consequently, organisms are fully digested by enough nitrifying bacteria to achieve a high efficient filtering process.

Of course it is understood that the above is merely a preferred embodiment of the invention and that various changes and alterations can be made, such as the number and/or arrangement of containers, the number of layers and/or size of infiltration spheres and the material of the spherical cores, without departing from the spirit and broader aspects thereof as set forth in the appended claims.

What is claimed is:

1. A multi-layer aerating filter comprising:
    a casing;
    a plurality of pan-like containers being sealed and arranged in a stack within said casing, wherein the uppermost container is sealed by a cover plate on its top edge; each of said containers having at least a water level pipe and a plurality of apertures thereon;
    a plurality of infiltration spheres being disposed on a bottom of each of said containers;
    a water inlet pipe connecting to said casing with one end penetrating into the uppermost container;
    a water discharge pipe connecting to said casing at one side near the bottom thereof;
    an air supply pipe passing through said casing with one end penetrating into the lowest container; and
    a blow-off pipe passing through said casing with one end penetrating into the uppermost container.

2. The multi-layer aerating filter as claimed in claim 1, wherein said infiltration sphere comprises a spherical frame consisting of two semi-spherical halves and a sponge-like spherical core contained in said spherical frame.

3. The multi-layer aerating filter as claimed in claim 2, wherein said spherical frame includes a plurality of longitudinal strips and latitudinal strips.

4. The multi-layer aerating filter as claimed in claim 2, wherein said spherical core has its diameter smaller than the inside diameter of said frame.

5. The multi-layer aerating filter as claimed in claim 3, wherein said longitudinal strip and latitudinal strip are provided with a plurality of outer projections and inner projections.

6. The multi-layer aerating filter as claimed in claim 5, wherein said outer projections are in the cone-like shape.

7. The multi-layer aerating filter as claimed in claim wherein said infiltration sphere has its diameter substantially double the height of said water level pipe.

* * * * *